United States Patent
Oda et al.

(10) Patent No.: US 10,614,168 B2
(45) Date of Patent: Apr. 7, 2020

(54) SYNTAX EVALUATION APPARATUS, TRANSLATION APPARATUS, SYNTAX EVALUATION METHOD, AND SYNTAX EVALUATION PROGRAM

(71) Applicant: National University Corporation Nara Institute of Science and Technology, Nara (JP)

(72) Inventors: Yusuke Oda, Nara (JP); Graham Neubig, Nara (JP); Sakriani Sakti, Nara (JP); Tomoki Toda, Nara (JP); Satoshi Nakamura, Nara (JP)

(73) Assignee: National University Corporation Nara Institute of Science and Technology, Nara (JP)

( * ) Notice: Subject to any disclaimer, the term of this patent is extended or adjusted under 35 U.S.C. 154(b) by 197 days.

(21) Appl. No.: 15/555,013

(22) PCT Filed: Feb. 23, 2016

(86) PCT No.: PCT/JP2016/055186
§ 371 (c)(1),
(2) Date: Aug. 31, 2017

(87) PCT Pub. No.: WO2016/140100
PCT Pub. Date: Sep. 9, 2016

(65) Prior Publication Data
US 2018/0107656 A1  Apr. 19, 2018

(30) Foreign Application Priority Data

Mar. 5, 2015  (JP) .................................. 2015-043827

(51) Int. Cl.
*G06F 17/20* (2006.01)
*G06F 17/28* (2006.01)
*G06F 17/27* (2006.01)
*G10L 15/26* (2006.01)

(52) U.S. Cl.
CPC .......... *G06F 17/289* (2013.01); *G06F 17/271* (2013.01); *G06F 17/274* (2013.01);
(Continued)

(58) Field of Classification Search
None
See application file for complete search history.

(56) References Cited

U.S. PATENT DOCUMENTS 5,001,633 A * 3/1991 Fukumochi ........... G06F 17/271
                                                   704/6
5,930,746 A * 7/1999 Ting ..................... G06F 17/271
                                                   704/2

(Continued)

FOREIGN PATENT DOCUMENTS

JP    2014219809 A    11/2014

OTHER PUBLICATIONS

Oda et al., "Sentence segmentation method for simultaneous speech translation by maximizing translation accuracy" Proc of the 20th annual meeting of the ANLP 23, Mar. 2014, pp. 302-304.*

(Continued)

*Primary Examiner* — Richard Z Zhu
(74) *Attorney, Agent, or Firm* — Haynes Beffel & Wolfeld, LLP; Mark A. Haynes; Paul A. Durdik

(57) ABSTRACT

A translation apparatus that can perform translation based on a correct syntax, a syntax evaluation apparatus employed in the translation apparatus, a syntax evaluation method, and a syntax evaluation program are provided. A syntax evaluation unit 13 includes a grammatical element guessing part 131 that guesses a grammatical element that should be connected before and after or after a word string indicated by first fragment data, and a grammatical element complementing part 132 that complements, based on the guessing result of the grammatical element guessing part 131, the first frag- (Continued)

ment data as necessary to generate second fragment data. When the grammatical element guessing part 131 guesses a grammatical element, the grammatical element complementing part 132 complements, at a location to which the grammatical element of the word string indicated by the first fragment data should be connected, a tag indicating the grammatical element in order to generate the second fragment data. When the grammatical element guessing part 131 does not guess a grammatical element, the grammatical element complementing part 132 handles the first fragment data as the second fragment data.

9 Claims, 10 Drawing Sheets

(52) U.S. Cl.
CPC ...... *G06F 17/2854* (2013.01); *G06F 17/2881* (2013.01); *G10L 15/265* (2013.01)

(56) References Cited

U.S. PATENT DOCUMENTS

| | | | | |
|---|---|---|---|---|
| 7,318,022 B2* | 1/2008 | Li | ................ | G06F 17/2785 704/10 |
| 7,562,008 B2* | 7/2009 | Chan | ................ | G06F 17/274 704/1 |
| 7,865,352 B2* | 1/2011 | Suzuki | ................ | G06F 17/2863 704/1 |
| 8,209,163 B2* | 6/2012 | Suzuki | ................ | G06F 17/2818 704/2 |
| 9,262,409 B2* | 2/2016 | Anisimovich | ........ | G06F 17/289 |
| 2002/0091509 A1* | 7/2002 | Zoarez | ................ | G06F 17/271 704/6 |
| 2003/0023423 A1* | 1/2003 | Yamada | ............ | G06F 17/2818 704/2 |
| 2003/0055626 A1* | 3/2003 | Miyahira | ............ | G06F 17/2775 704/9 |
| 2004/0193401 A1* | 9/2004 | Ringger | ............ | G06F 17/2715 704/9 |
| 2009/0182549 A1* | 7/2009 | Anisimovich | ...... | G06F 17/2755 704/4 |
| 2012/0239378 A1* | 9/2012 | Parfentieva | ......... | G06F 17/2785 704/4 |

OTHER PUBLICATIONS

Oda et al., Proc. of the 20th annual meeting of the ANLP May 23, 2014 p. 302-305. Japanese language.

Sugunuma et al., "Extracting Method of Coordinate Structures in Japanese Documents for a Writing Tool," English Abstract, IPSJ SIG Technical Reports, vol. 99, No. 25, Apr. 8, 2011, 11 pages.

* cited by examiner

FIG. 5A   *In the next 18 minutes I*

FIG. 5C   *In the next 18 minutes I  [VP]*

SYNTAX EVALUATION APPARATUS, TRANSLATION APPARATUS, SYNTAX EVALUATION METHOD, AND SYNTAX EVALUATION PROGRAM

TECHNICAL FIELD

The present invention relates to a translation apparatus that translates a source language into a target language, a syntax evaluation apparatus employed in the translation apparatus, a syntax evaluation method, and a syntax evaluation program.

BACKGROUND ART

A simultaneous translation apparatus that has been developed in recent years generates text data by recognizing input speech, translates the text data, and sequentially outputs synthesized speech and a text image, whereby the input speech is translated and output in real time.

For a simultaneous translation apparatus, a shorter time required between speech input and translation result output (a higher level of simultaneousness) is more preferable. Also, not only for the simultaneous translation apparatus, but also for other types of translation apparatuses, a shorter time required between text data input and translation result output is more preferable.

For this purpose, consecutively translating input text data on a per-phrase basis (hereinbelow, a "phrase" refers to a word or a group of a plurality of words) enables shortening of the time required for outputting the translation result. However, in this case, as the context of a phrase is ignored in the translation, the translation accuracy decreases.

On the other hand, when translation of input text data is initiated upon confirmation of the end of the sentence, the translation accuracy can be increased. However, in this case, the time required for outputting the translation result increases. In particular, during a lecture or the like, when text data generated by collecting and recognizing the speech of the lecturer is translated simultaneously, one sentence is long and the end of the sentence is not clear. In this translation method, therefore, the time required for outputting the translation result increases.

Patent Document 1 proposes a text data segmentation apparatus to solve this problem. The text data segmentation apparatus segments text data between a pre-translated phrase and its following phrase when the chance that the word order of the aforementioned phrases is maintained (word order is not reversed) before and after translation is a certain percentage or higher. This text data segmentation apparatus can segment text data at a location where the word order does not change after translation. Accordingly, only by sequentially translating text data segmented by this text data segmentation apparatus, the time required for outputting the translation result can be decreased and the translation accuracy can be increased.

PRIOR ART DOCUMENT

Patent Document

Patent Document 1: Japanese Patent Application Publication NO. 2014-219809

SUMMARY OF THE INVENTION

Problems to be Solved by the Invention

When segmented text data is translated, segmentation is not necessarily made at an appropriate location. Segmentation is often made without considering the syntax (sentence structure), particularly modifications. Hence, literally translating segmented text data results in a translation that does not consider the syntax (translation based on a wrong syntax), which causes deterioration of the translation accuracy.

Therefore, an object of the present invention is to provide a translation apparatus that can perform translation based on a correct syntax, a syntax evaluation apparatus employed in the translation apparatus, a syntax evaluation method, and syntax evaluation program.

Means for Solving the Problem

To achieve the above object, in accordance with the present invention, there is provided a syntax evaluation apparatus comprising: a grammatical element guessing part that guesses, based on first fragment data that is acquired by segmenting text data indicating a string of a source language and that indicates at least one word, a grammatical element that should be connected before and after or after a word string indicated by the first fragment data; and a grammatical element complementing part that generates, based on the guessing result of the grammatical element guessing part, second fragment data by complementing the first fragment data as necessary. When the grammatical element guessing part guesses a grammatical element, the grammatical element complementing part generates the second fragment data by complementing a tag that indicates the grammatical element, at the location to which the grammatical element of the word string indicated by the first fragment data should be connected. When the grammatical element guessing part does not guess a grammatical element, the grammatical element complementing part handles the first fragment data as the second fragment data.

This syntax evaluation apparatus enables acquisition of second fragment data by which the syntax analysis result is correct.

In the aforementioned syntax evaluation apparatus, it is preferable that based on a predetermined number of consecutive words following the first word of the word string indicated by the first fragment data, the grammatical element guessing part guesses a grammatical element that should be connected before the word string indicated by the first fragment data. It is also preferable that based on a predetermined number of consecutive words preceding the last word of the word string indicated by the first fragment data, the grammatical element guessing part guesses a grammatical element that should be connected after the word string indicated by the first fragment data.

This syntax evaluation apparatus can guess a grammatical element that should be connected before and after or after a word string indicated by the first fragment data based on a predetermined word of the word string that is indicated by the first fragment data and is closely related to the grammatical element that should be connected before and after or after the word string indicated by the first fragment data. Therefore, the grammatical element that should be connected before and after or after the word string indicated by the first fragment data can be accurately guessed.

Also, it is preferable that the aforementioned syntax evaluation apparatus further comprises a syntax analysis part that performs syntax analysis of the word string indicated by the first fragment data and identifies a grammatical element of the word string indicated by the first fragment data. Based on the grammatical element of the word string indicated by the first fragment data identified by the syntax analysis part, the grammatical element guessing part guesses the grammatical element that should be connected before and after or after the word string indicated by the first fragment data.

This syntax evaluation apparatus can guess a grammatical element that should be connected before and after or after a word string indicated by first fragment data based on the grammatical element of the word string that is indicated by the first fragment data and is closely related to the grammatical element that should be connected before and after or after the word string indicated by the first fragment data. Therefore, the grammatical element that should be connected before and after or after the word string indicated by the first fragment data can be accurately guessed.

Moreover, it is preferable that the aforementioned syntax evaluation apparatus further comprises a syntax analysis part that performs syntax analysis of a word string indicated by the second fragment data, identifies a grammatical element of the word string indicated by the second fragment data, and generates syntax data that express the structure of the word string by the grammatical element.

Together with the second fragment data, this syntax evaluation apparatus enables generation of syntax data indicating the correct syntax analysis result of the second fragment data.

Also, according to the present invention, there is provided a translation apparatus comprising: the aforementioned syntax evaluation apparatus; and a translation unit that translates a word string of the source language that is obtained by acquiring the second fragment data into a word string of the target language so that the word order is based on the syntax data.

This translation apparatus enables translation of second fragment data based on the correct syntax analysis result of second fragment data indicated by syntax data.

As well, in the aforementioned translation apparatus, it is preferable that the syntax evaluation apparatus sequentially acquires the first fragment data that is obtained by segmenting the text data in order from beginning to end and sequentially generates the second fragment data. It is also preferable that the translation unit translates, into a word string of the target language containing a tag, a word string of the target language containing the tag that is obtained by acquiring the second fragment data. In addition, it is preferable that when the tag is contained in the word string of the target language that is acquired by translation, the translation unit again performs translation for a word string of the source language formed by linking, behind the pre-translated word string of the source language, a word string of the source language indicated by the second fragment data that is generated next by the syntax evaluation apparatus.

When a tag is contained in a translated word string, this translation apparatus performs standby and then translation by combining the translated word string with a word string indicated by second fragment data that is to be input next, whereby highly accurate translation is possible.

Moreover, in the aforementioned translation apparatus, it is preferable that when the tag is located at a location other than the end of the word string of the target language that is obtained by translation, the translation unit again performs translation for a word string of the source language formed by linking, behind the pre-translated word string of the source language, a word string of the source language indicated by the second fragment data that is generated next by the syntax evaluation apparatus. It is also preferable that when the tag is located at the end of the target language that is obtained by translation, the translation unit removes, from the word string of the target language, the tag located at the end of the word string.

Only when a tag is located at a location of the translated word string where tag removal is difficult (a non-end location), this translation apparatus stands by for translation. Accordingly, the standby time can be reduced as much as possible, and quick translation (simultaneousness can be enhanced) is possible.

Furthermore, in the aforementioned translation apparatus, it is preferable that when the translation unit translates a word string of the source language in which the tag is located at its beginning and which is obtained by acquiring the second fragment data, the translation unit determines: whether to remove in advance the tag located at the beginning of the pre-translated word string of the source language from the word string of the target language that is obtained by translation; or whether to link, behind the pre-translated word string of the source language, a word string of the source language indicated by the second fragment data that the syntax evaluation apparatus generates next without considering the tag that is located at the beginning of the pre-translated word string of the target language and is contained in the word string of target language that is obtained by translation.

In this translation apparatus, by ignoring a tag that cannot be translated by linking word strings of the source language (tag located at the forefront of the word string of the source language) and determining the necessity of standby for translation based only on a tag that can be translated by linking word strings of the source language (tag located at the end of the word string of the source language), unnecessary standby can be prevented from occurring. Accordingly, the standby time can be reduced as much as possible, and quick translation (simultaneousness can be enhanced) is possible.

In addition, according to the present invention, there is provided a syntax evaluation method comprising: a grammatical element guessing step of guessing, based on first fragment data that is obtained by segmenting text data indicating a string of the source language and that indicates at least one word, a grammatical element that should be connected before and after or after a word string indicated by the first fragment data; and a grammatical element complementing step of generating, based on the guessing result of the grammatical element guessing step, second fragment data by complementing the first fragment data as necessary. In the grammatical element complementing step, when a grammatical element is guessed in the grammatical element guessing step, the second fragment data is generated by complementing a tag that indicates the grammatical element, at a location to which the grammatical element of the word string indicated by the first fragment data should be connected. Also, in the grammatical element complementing step, when a grammatical element is not guessed in the grammatical element guessing step, the first fragment data is handled as the second fragment data.

As well, according to the present invention, there is provided a syntax evaluation program comprising a programing step, the programing step that executes, on a computer, each step comprised in the aforementioned syntax evaluation method.

Effect of the Invention

The aforementioned syntax evaluation apparatus, translation apparatus, syntax evaluation method, and syntax evaluation program enable acquisition of second fragment data by which the syntax analysis result is correct. Therefore, performance of translation using this second fragment data enables translation based on a correct syntax.

BRIEF DESCRIPTION OF THE DRAWINGS

FIGS. 5A to 5D are views illustrating specific example operation of a syntax evaluation unit.

DESCRIPTION OF EMBODIMENT

Hereinbelow, a translation apparatus in accordance with an embodiment of the present invention is explained in reference to the drawings. In order to specify the description, the text to follow illustrates a simultaneous translation apparatus as an example of the translation apparatus in accordance with the embodiment of the present invention. However, the present invention is not limited to a simultaneous translation apparatus. Also, in order to specify the description, an example where the source language (language before translation) is English and the target language (language after translation) is Japanese is appropriately illustrated. However, the translation apparatus in accordance with the embodiment of the present invention is applicable for a language other than English and Japanese.

<Translation Apparatus>

Figure 1:
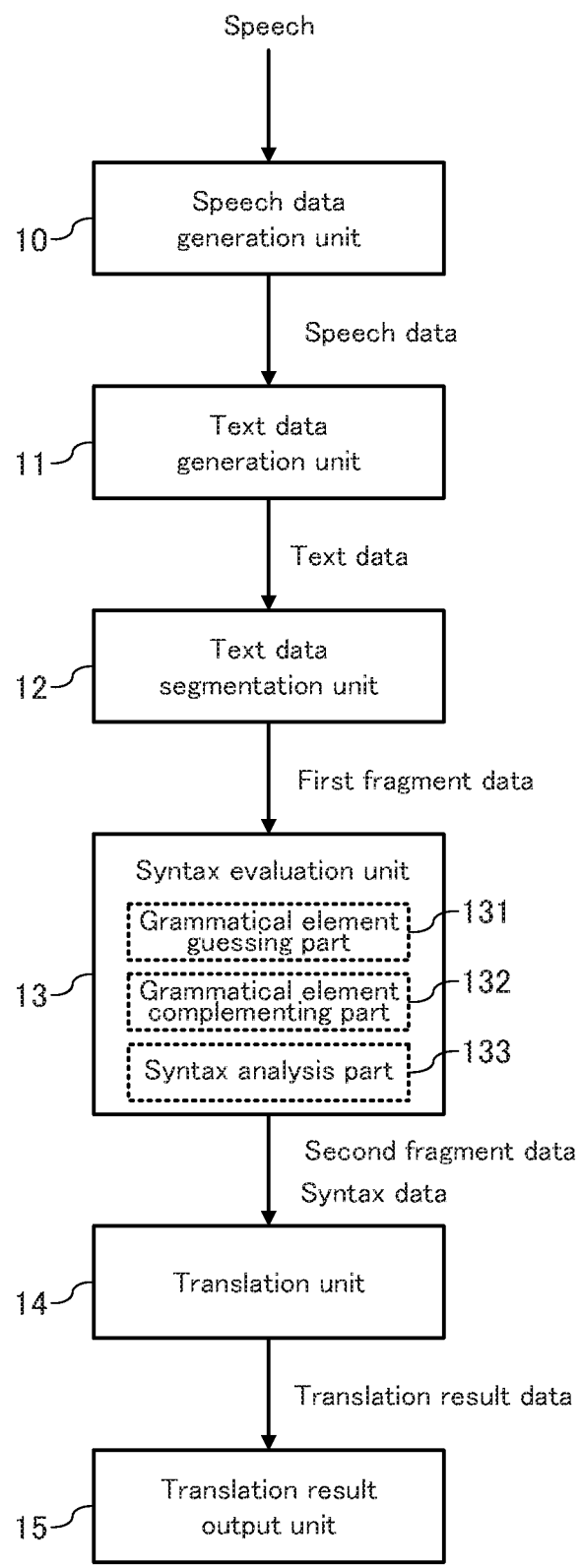
FIG. 1 is a block diagram illustrating an example configuration of a translation apparatus in accordance with an embodiment of the present invention.

First of all, the overall configuration and operation of the translation apparatus in accordance with the embodiment of the present invention are explained in reference to the drawings. FIG. 1 is a block diagram illustrating an example configuration of the translation apparatus in accordance with the embodiment of the present invention.

As illustrated in FIG. 1, a translation apparatus 1 in accordance with the embodiment of the present invention includes a speech data generation unit 10, a text data generation unit 11, a text data segmentation unit 12, a syntax evaluation unit (syntax evaluation apparatus) 13, a translation unit 14, and a translation result output unit 15.

The speech data generation unit 10 consists of, e.g., a microphone and converts collected speech into an electric signal, whereby speech data is sequentially generated.

The text data generation unit 11 uses a well-known speech recognition method to convert, into text (as well as word or morpheme), speech data sequentially generated by the speech data generation unit 10. Thereby, the text data generation unit 11 sequentially generates text data indicating a series of strings (as well as word or morpheme strings) of the source language. For instance, the text data generation unit 11 performs speech recognition of speech data based on a pre-constructed sound model (data indicating correspondence with speech and text (as well as word or morpheme)) in order to generate text data. The text data generated by the text data generation unit 11 may be data in which strings are distinguished on the basis of a specified unit, such as word or morpheme.

The text data segmentation unit 12 segments in order, from beginning to end, the text data sequentially generated by the text data generation unit 11 and thereby sequentially generates first fragment data indicating at least one word. In this case, the text data segmentation unit 12 may use any method to segment text data. For instance, the text data segmentation unit 12 may simply segment text data on the basis of a specified number of words to thereby generate first fragment data. Also, the same method as the method of the aforementioned text data segmentation apparatus of Patent Document 1 may be used to segment text data to generate first fragment data.

The syntax evaluation unit 13 sequentially acquires the first fragment data sequentially generated by the text data segmentation unit 12. When necessary, the syntax evaluation unit 13 sequentially generates second fragment data that complements the grammatical element of the first fragment data and syntax data that expresses, by the grammatical element of a word string indicated by the second fragment data, the structure of the word string. The grammatical element is a segment grouped by focusing on the grammatical function and form of the phrase. Also, the details of the syntax evaluation unit 13 will be hereinafter discussed.

The translation unit 14 translates a word string of the source language indicated by the second fragment data, which is sequentially generated by the syntax evaluation unit 13, into a word string of the target language based on the syntax data sequentially generated by the syntax evaluation unit 13. In turn, the translation unit 14 sequentially generates translation result data indicating the translation result. The details of the translation unit 14 will be hereinafter discussed.

The translation result output unit 15 sequentially outputs, in a human perceivable form, the translation result data sequentially generated by the translation unit 14. For instance, the translation result output unit 15 includes a display that outputs a translation result as a text image, and a speaker that synthesizes the translation result as speech and outputs the speech.

The processing of the text data generation unit 11, the text data segmentation unit 12, the syntax evaluation unit 13, and the translation unit 14, each of which constitutes a part of the translation apparatus 1, is operation processing performed by at least one computer hardware resource (central processing unit (CPU), various types of storage devices, etc.) and software resource (operating system (OS) and various types of drivers, etc.). The aforementioned operation processing is achieved by means of software—i.e., by means of executing a program whose execution is controlled by the CPU. Accordingly, this program includes a programing step of executing, on the computer, the processing performed by each of the text data generation unit 11, the text data segmentation unit 12, the syntax evaluation unit 13, and the translation unit 14.

<Syntax Evaluation Unit>

In turn, the syntax evaluation unit 13 will be explained in reference to the drawings. First of all, as illustrated in FIG. 1, the syntax evaluation unit 13 includes a grammatical element guessing part 131, a grammatical element complementing part 132, and a syntax analysis part 133.

When there are grammatical elements that should be connected to a word string indicated by first fragment data before and after the word string, the grammatical element guessing part 131 guesses the grammatical element. For instance, the grammatical element guessing part 131 guesses a grammatical element by a grouping unit (e.g., a linear Support Vector Machine (SVM)) constructed through machine learning.

In the case where grammatical elements that should be connected to a word string therebefore and thereafter are guessed, the syntax of the word string can be erroneously analyzed. A typical case is where a word string is segmented at the first or last word thereof in the middle of the sentence or phrase. In this case, an erroneous analysis can occur as it is difficult to analyze that the aforementioned sentence or phase exists before or after the word string. Specifically, for instance, even though the first or last word of a word string constitutes a phrase different from a phrase constituted by a word in the word string and adjacent to the aforementioned first or last word, an erroneous analysis indicating that these two words constitute the same phrase can occur (see, e.g., FIG. 5B below). Also, for instance, an erroneous grammatical element can be determined for the first or last word or another word (see, e.g., FIGS. 4B and 4C below).

To generate second fragment data, the grammatical element complementing part 132 complements, at the location to which the grammatical element of a word string indicated by first fragment data should be connected, a tag indicating the grammatical element guessed by the grammatical element guessing part 131. However, when the grammatical element guessing part 131 does not guess the grammatical element of the word string indicated by the first fragment data, the grammatical element complementing part 132 does not complement the tag as described above and handles the first fragment data as-is as the second fragment data. Also, the second fragment data generated by the grammatical element complementing part 132 is transferred to the downstream translation unit 14.

The syntax analysis part 133 uses a well-known syntax analysis method, such as the Cocke-Kasami-Younger (CKY) method, to analyze the syntax of the first fragment data and the second fragment data. The syntax analysis part 133 determines the grammatical element of the word string indicated by the first fragment data and the grammatical element of the word string indicated by the second fragment data. The result of syntax analysis of the first fragment data by the syntax analysis part 133 is used for guessing a grammatical element by the grammatical element guessing part 131. The result of syntax analysis of the second fragment data by the syntax analysis part 133 is transferred to the downstream translation unit 14 as syntax data.

Figure 2:
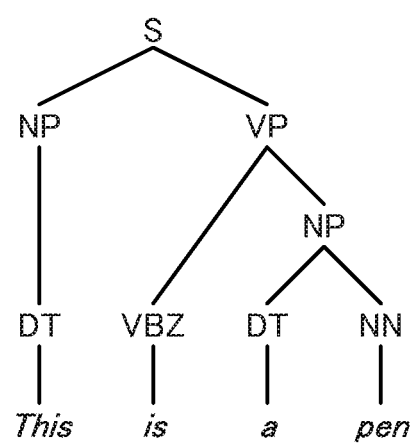
FIG. 2 is a view illustrating teacher data used for machine learning of a grammatical element guessing part.
Figure 3A:
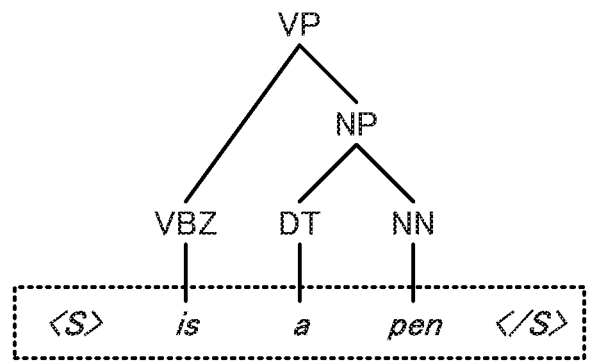
FIGS. 3A to 3C are views illustrating learning data that can be acquired from the teacher data of FIG. 2.
Figure 3B:
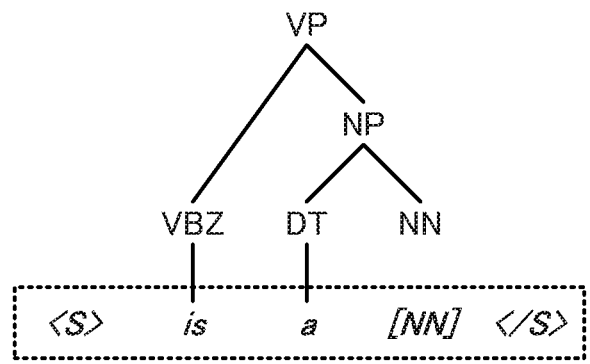
Figure 3C:
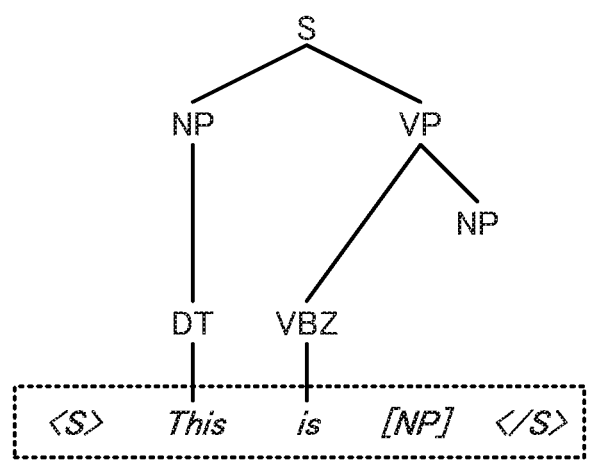

Next, a specific example of training data used for machine learning by the grammatical element guessing part 131 will be explained in reference to the drawings. FIG. 2 is a view illustrating teacher data used for machine learning of the grammatical element guessing part. FIGS. 3A to 3C are views illustrating training data that can be acquired from the teacher data of FIG. 2.

As illustrated in FIG. 2, the teacher data used for machine learning of the grammatical element guessing part 131 is data indicating correspondence between a word string of an example sentence and a syntax tree that correctly illustrates the grammatical element of the word string. The syntax tree is one method that expresses the grammatical element of a word string and hierarchically illustrates the grammatical elements of the sentence, the phrase, the word, and the like. Also, this kind of teacher data can be obtained from a publicly known tree bank, such as Penn Treebank.

FIG. 2 illustrates the word string "This is a pen" of the example sentence, and an example syntax tree of the word string. The grammatical element guessing part 131 conducts training using training data created by extracting one or a plurality of words from this word string of the example sentence (consecutive words when a plurality of words is extracted, and two or more words are preferable in this embodiment). In FIG. 2, upper case alphabets, such as "S (sentence)", "VP (verb phrase)", "NP (noun phrase)", "DT (determiner)", "VBZ (verb, third-person, singular, and present), and "NN (singular noun), are grammatical elements constituting the syntax tree.

Each training data illustrated as example in FIGS. 3A to 3C (word string surrounded by the dashed line in the figure) contains: "<s>", which is a notation indicating the beginning (forefront and left end) of the word string; and "</s>", which is a notation indicating the end (last and right-end) of the word string. Also, when extraction of a word causes a phrase or word corresponding to the node (branch) of the syntax tree to be absent in each training data, a tag indicating the grammatical element of the absent phrase or word complements the phrase or word. In addition, a tag indicating a higher-level grammatical element (grammatical element with a minimum node) is complemented in the training data.

The training data of FIG. 3A, "<s> is a pen </s>", is generated by extracting "is a pen" from the word string of the example sentence of FIG. 2. In the aforementioned training data, the entire word string thus extracted constitutes a "VP (verb phrase)." As a phrase or word corresponding to the node is not absent, the grammatical element is not complemented.

The training data of FIG. 3B, "<s> is a [NN]</s>", is generated by extracting "is a" from the word string of the example sentence of FIG. 2. In this training data, the word "pen", which corresponds to the node of "NN", is absent. The tag "[NN]", which indicates "NN"—i.e., the grammatical element of the word "pen"—complements this word.

The training data of FIG. 3C, "<s> This is [NP]</s>", is generated by extracting "This is" from the word string of the example sentence of FIG. 2. In this training data, the phrase "a pen", which correspond to the node of "NP", is absent. The tag "[NP]", which indicates "NP"—i.e., the grammatical element of the phrase "a pen"—complements the phrase "a pen." As described above, the complementing tag in the training data indicates a higher-level grammatical element (grammatical element with the smallest number of nodes). The complementing tag in the training data is not "[DT] [NN]," but "[NP]."

From the training data of each of FIGS. 3A to 3C, the syntax tree shown above the training data (syntax tree grammatically equivalent to the teacher data of FIG. 2—i.e., correct syntax tree) can be acquired from syntax analysis by the syntax analysis part 133. Accordingly, it can be said that the training data of each of FIGS. 3A to 3C presents an example correct answer of the grammatical element to be complemented to acquire a word string by which the correct syntax tree can be obtained.

Figure 4A:
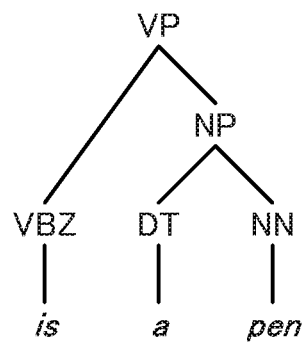
FIGS. 4A to 4C are views illustrating a syntax tree that can be acquired when syntax analysis is performed without complementing the word strings of FIGS. 3A to 3C.
Figure 4B:
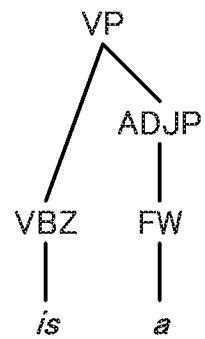
Figure 4C:
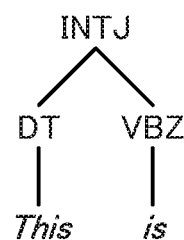

The foregoing will be hereinbelow explained in reference to FIGS. 4A to 4C. FIGS. 4A to 4C are views illustrating a syntax tree that can be acquired when syntax analysis is performed without complementing a grammatical element for the word strings of FIGS. 3A to 3C. Also, FIG. 4A is a view illustrating a syntax tree that can be acquired from the word string "is a pen" of FIG. 3A. FIG. 4B is a view illustrating a syntax tree that can be acquired from the word string "is a" of FIG. 3B. FIG. 4C is a view illustrating a syntax tree that can be acquired from the word string "This is" of FIG. 3C.

As illustrated in FIG. 4B and FIG. 4C, a correct syntax tree cannot be acquired when syntax analysis is performed for a word string as-is and the word string needs to be complemented. As illustrated in FIG. 4A, a correct syntax tree can be acquired when syntax analysis is performed for a word string that does not need to be complemented.

When the grammatical element guessing part 131 conducts a considerable amount of training using the aforementioned training data and constructs the aforementioned grouping unit, as a result of performance of syntax analysis, it is possible to generate second fragment data (guessing of a grammatical element to be complemented to generate the second fragment data) by which a syntax tree is correct.

FIGS. 3A to 3C illustrate example training data for guessing a grammatical element to be complemented after a word string. Use of the same method as the method of FIGS. 3A to 3C enables acquisition of training data for guessing a grammatical element to complement the portion before the word string. The grammatical element guessing part 131 conducts training using the above two types of training data and constitutes the aforementioned grouping unit.

specific example operation of the syntax evaluation unit 13 (specific example operation of each of the grammatical element guessing part 131, the grammatical element complementing part 132, and the syntax analysis part 133) will be explained in reference to the drawings. FIGS. 5A to 5D are views illustrating specific example operation of the syntax evaluation unit.

Figure 5B:
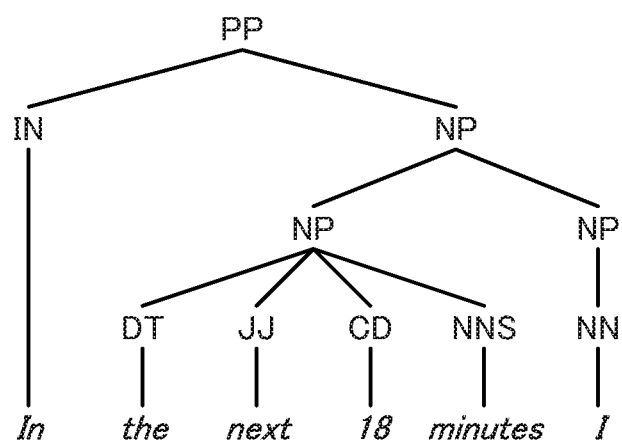
Figure 5D:
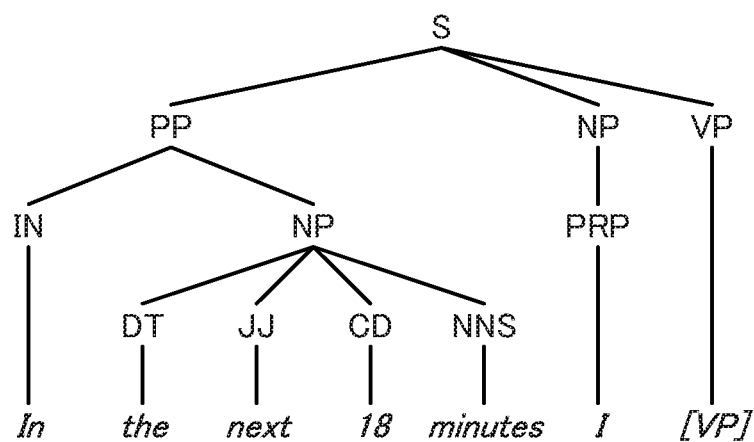

FIG. 5A is a view illustrating a specific example word string indicated by first fragment data. FIG. 5B is a view illustrating a syntax tree that can be acquired when the syntax analysis part performs syntax analysis of the first fragment data of FIG. 5A. FIG. 5C is a view illustrating second fragment data that can be acquired when the grammatical element complementing part complements the word string indicated by the first fragment data of FIG. 5A. FIG. 5D is a view illustrating a syntax tree that can be acquired when the syntax analysis part performs syntax analysis of the second fragment data of FIG. 5C.

As illustrated in FIG. 5A, the first fragment data of this example indicates the word string "In the next 18 minutes I." However, the first fragment data is generated as a result of segmentation by the text data segmentation unit 12 that does not address the entire syntax of the word string indicated by text data.

The syntax analysis part 133 performs syntax analysis assuming that the word string indicated by the first fragment data of FIG. 5A is one combined sentence (there is no node where a phrase or word is absent). Therefore, as illustrated in FIG. 5B, the syntax tree that can be acquired from syntax analysis of the first fragment data by the syntax analysis part 133 is different from the original syntax tree that can be acquired by performing syntax analysis of text data before being segmented (specifically, the syntax tree is incorrect).

As illustrated in FIG. 5C, the grammatical element guessing part 131 guesses the grammatical element "VP" that should complement the word string of the first fragment data illustrated in FIG. 5A by which a correct syntax tree cab be obtained. In addition, to generate second fragment data, the grammatical element complementing part 132 complements, at the location to which the grammatical element "VP" of the word string indicated by the first fragment data should be connected (after the word string in this case), the tag "[VP]", which indicates the grammatical element "VP" guessed by the grammatical element guessing part 131.

In this case, based on the word string indicated by the first fragment data and the syntax analysis result of the first fragment data, the grammatical element guessing part 131 guesses a grammatical element that should connected before and after the word string indicated by the first fragment data.

Specifically, based on a predetermined number of consecutive words (for instance, three words) following the first word of the word string indicated by the first fragment data, the grammatical element guessing part 131 guesses a grammatical element that should be connected before the word string indicated by the first fragment data. Likewise, based on a predetermined number of consecutive words preceding the last word of the word string indicated by the first fragment data, the grammatical element guessing part 131 guesses a grammatical element that should be connected after the word string indicated by the first fragment data. Specifically, the grammatical element guessing part 131 uses these words in the word string indicated by the first fragment data as a feature to guess a grammatical element that should connected before and after the word string indicated by the first fragment data. To conduct training using the aforementioned training data (see FIGS. 3A to 3C), the grammatical element guessing part 131 focuses on the relationship between this feature and the grammatical element to be guessed (complemented) and constructs a grouping unit.

In this case, the grammatical element guessing part 131 may combine, with a word in the word string indicated by the first fragment data, the grammatical element (part of speech) of the word identified by analysis of the syntax analysis part 133 so as to define that the combination is a feature of the grouping unit. Specifically, for instance, in the example presented in FIG. 5B, the grammatical element guessing part 131 may combine the first three words and their respective grammatical elements (("IN"—"in", "DT"—"the" "JJ"—"next")) and combine the last three words and their respective grammatical elements ("NN"—"I", "NNS"—"minutes", "CD"—"18") so as to use the combinations as features.

The first and last words (and words in their neighborhood) in the word string indicated by the first fragment data are adjacent to the word or phrase before and after the word string. It can be said that a close relationship exists between the first and last words and the grammatical element that should be connected before and after the word string (grammatical element of the word or phrase before and after the word string). Therefore, by using these as features, the grammatical element that should be connected before and after the word string indicated by the first fragment data can be accurately guessed.

As well, based on the grammatical element of the word string indicated by the first fragment data identified by the syntax analysis part 133, the grammatical element guessing part 131 guesses a grammatical element that should be connected before and after the word string indicated by the first fragment data. Specifically, the grammatical element guessing part 131 uses, as a feature, the grammatical element of the word string indicated by the first fragment data identified by the syntax analysis part 133 to guess a grammatical element that should be connected before and after the word string indicated by the first fragment data. To conduct training using the aforementioned training data (see FIGS. 3A to 3C), the grammatical element guessing part 131 focuses on the relationship between the aforementioned feature and the grammatical element to be guessed (complemented) and constructs a grouping unit.

In this case, the grammatical element guessing part 131 may use, as features, the grammatical element of the entire word string indicated by the first fragment data identified by the syntax analysis part 133 (highest-level grammatical element, which is the starting point of the node) and the grammatical element one level below the aforementioned grammatical element. Specifically, for instance, in the example of FIG. 5B, the grammatical element guessing part 131 guesses a grammatical element that should be connected before and after the word string indicated by the first fragment data, by using "PP", which is the grammatical element of the entire word string, and "IN" and "NP", which are the grammatical elements at the level that is one level below, as features.

Regardless of whether the syntax analysis result is correct or incorrect, the grammatical element of the word string indicated by first fragment data identified by the syntax analysis part 133 is typified as a finite pattern. It can be said that a close relationship exists between the aforementioned grammatical element and a grammatical element to be guessed (e.g., a grammatical element to be guessed is determined for each syntax tree pattern). Therefore, by using this as a feature, a grammatical element that should be connected before and after the word string indicated by the first fragment data can be accurately guessed.

Roughly two types of features have been illustrated as examples. However, either one of the two types may be used as a feature, and a characteristic other than the aforementioned word or grammatical element may be used as a feature in addition to (or instead of) the above types of features.

Next, with regard to the word string indicated by the second fragment data of FIG. 5C, the syntax analysis part 133 handles the tag "[VP]" as the grammatical element "VP" to perform syntax analysis. Thereby, the syntax tree acquired through syntax analysis of the second fragment data by the syntax analysis part 133 is not the incorrect syntax tree illustrated in FIG. 5B, but the correct syntax tree illustrated in 5D.

Then, the syntax analysis part 133 transfers the syntax analysis result (syntax tree) of the second fragment data, which is illustrated in FIG. 5D, to the downstream translation unit 14 as syntax data. In addition, the grammatical element complementing part 132 transfers the second fragment data illustrated in FIG. 5C to the downstream translation unit 14.

As well, unlike the example illustrated in FIGS. 5A to 5D, the grammatical element guessing part 131 eventually does not guess a grammatical element that should be connected before and after the word string indicated by the first fragment data. In this case, there is no grammatical element that should be connected before and after the word string indicated by the first fragment data (for instance, as in the case of the word string illustrated in FIG. 3A, the words constitute one sentence). Thus, a correct syntax tree can be acquired when syntax analysis is performed for the aforementioned word string as-is. Therefore, the grammatical element complementing part 132 handles the first fragment data as-is as the second fragment data.

As described above, second fragment data by which the syntax analysis result is correct can be acquired by the syntax evaluation unit 13. Therefore, performance of translation using this second fragment data enables translation based on a correct syntax.

FIGS. 5A to 5D illustrate example situations where the grammatical element after the word string indicated by the first fragment data is guessed and complemented to generate second fragment data. The same method can be used to guess and complement the grammatical element before the word string indicated by the first fragment data to generate second fragment data.

<Translation Unit>

Next, the translation unit 14 will be explained in reference to the drawings. As illustrated in FIG. 1, based on syntax data transferred from the syntax evaluation unit 13, the translation unit 14 translates second fragment data transferred likewise from the syntax evaluation unit 13.

Specifically, the translation unit 14 performs Tree-To-String translation whereby a word string of the source language indicated by the second fragment data is translated into a word string of the target language so that the word order is based on the syntax data.

Figure 6:
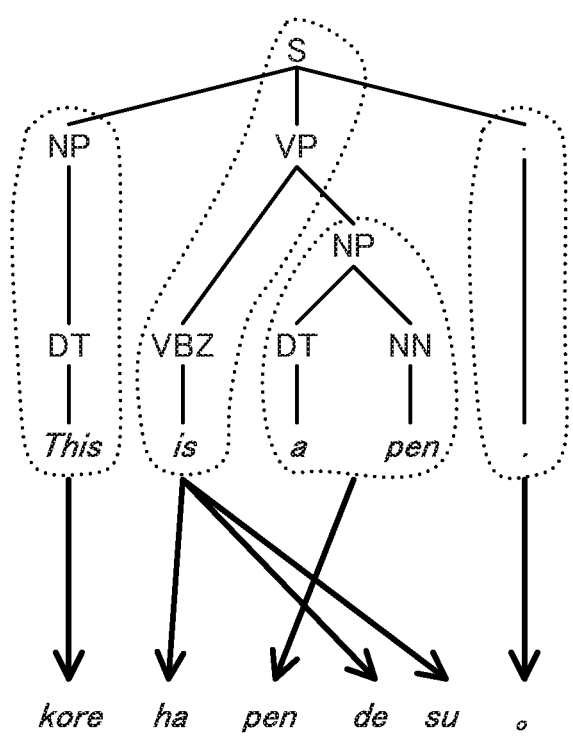
FIG. 6 is a view illustrating a specific example of a Tree-To-String translation method.

Tree-To-String translation performed by the translation unit 14 will be explained in reference to the drawings. FIG. 6 is a view illustrating a specific example of the Tree-To-String translation method.

FIG. 6 illustrates an example situation where Tree-To-String translation is performed for the word string "This is a pen." The example situation of FIG. 6 demonstrates that when the word string "This is a pen" is translated into the target language in the word order based on the grammatical element of the word string, it is possible to acquire the sentence "kore ha pen de su", which sounds natural in the target language. In this way, the accuracy of Tree-To-String translation is higher than that of a translation method of simply translating each phrase (phrase-based translation).

Figure 7:
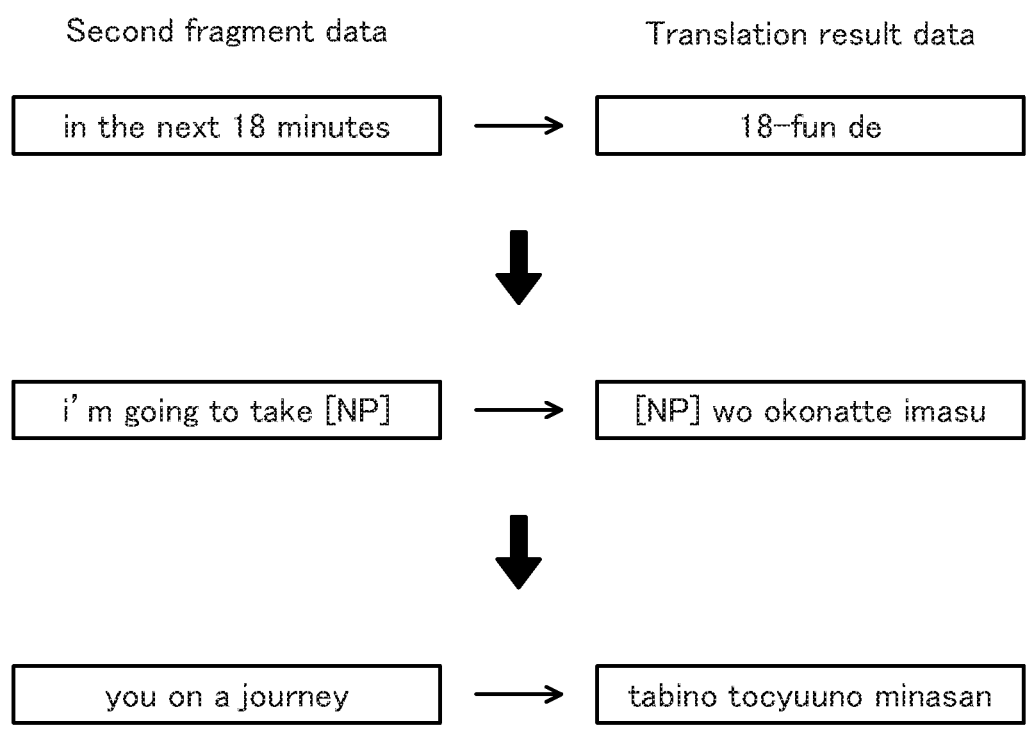
FIG. 7 is a view illustrating a problem that occurs when a translation unit performs Tree-To-String translation.

However, the translation unit 14 cannot translate, into the target language, a tag that is contained in the word string indicated by the second fragment data. Accordingly, the translation unit 14 has to translate a tag-containing word string of the source language into a tag-containing word string of the target language (Tree-To-String translation). The problem of this situation is that the tag is placed at a location of the translated word string of the target language where tag removal is difficult. This problem will be explained in reference to the drawings. FIG. 7 is a view illustrating the problem that occurs when the translation unit performs Tree-To-String translation.

The example situation of FIG. 7 demonstrates that word strings indicated by the second fragment data are sequentially input into the translation unit 14 are in the order of: "in the next 18 minutes", "i'm going to take [NP]", and "you on a journey" In this case, the translation result of the second word string is "[NP] wo okonatte imasu", and the tag "[NP]" is located at the forefront of the translated word string. As a result of removing the forefront tag "[NP]" from the translated word string, a part of the translated word string is removed, and the translation can be unclear. Also, when a tag exists not only at the forefront of the translated word string, but also in the middle of the aforementioned string, a part of the translated word string is removed, and the translation can be unclear.

Figure 8:
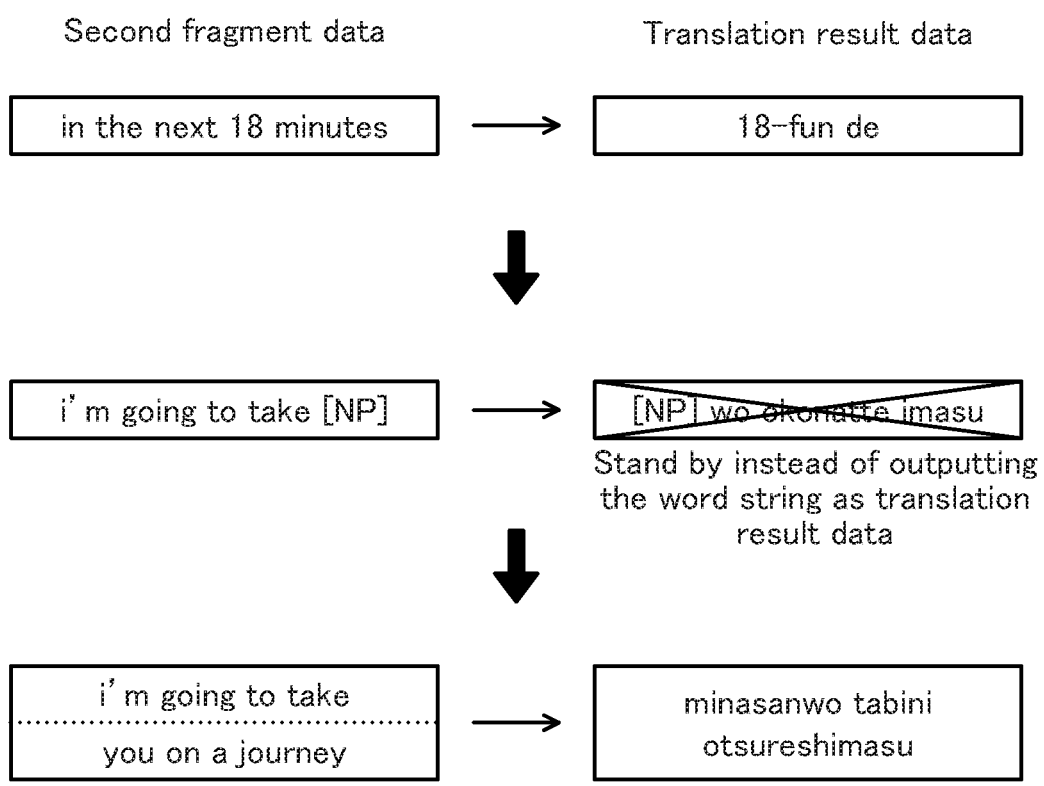
FIG. 8 is a view illustrating example operation of the translation unit directed to solving the problem of FIG. 7.

To address the foregoing, the translation unit 14 performs translation using a method that solves the problem illustrated in FIG. 7. Example operation of this translation unit 14 will be explained in reference to the drawings. FIG. 8 is a view illustrating example operation of the translation unit directed to solving the problem illustrated in FIG. 7.

In the example illustrated in FIG. 8, the word string illustrated by second fragment data sequentially input into the translation unit 14 is the same as that of FIG. 7. However, in this example of FIG. 8, when the translation unit 14 acquires the translation result of the second word string "[NP] wo okonatte imasu", the translation unit 14 stands by instead of outputting the word string as translation result data. In addition, by linking the pre-translated word string of the source language, "i'm going to take [NP]", with the word string of the source language "you on a journey", which is second fragment data that can be acquired next, the word string of the source language, "i'm going to take you on a journey", can be formed. This word string is translated again, and the acquired translation result "minasan wo tabini otsureshimasu" is output as translation result data.

As described above, when word strings of the source language are linked, the last tag of the preceding word string, "[NP]", corresponds to a part or whole of the following word string "you on a journey (in this example, corresponds to 'you')." Therefore, when the last tag of the preceding word string, "[NP]", is linked with the following word string, "you on a journey", the aforementioned last tag is removed (substituted). Likewise, the tag located at the forefront of the following word string is removed (substituted) when the word strings of the source language are linked.

In this manner, standby is performed when a tag is located at the forefront or in the middle of the translated word string. The word string indicated by the second fragment data to be input next is linked with the pre-translated word string of the source language in order to perform translation. A translation result without a tag can be thereby acquired. Accordingly, generation of an unclear translation result including a tag can be prevented.

On the other hand, when a tag is located at the end of the translated word string, removal of the tag from the translated word string causes absence of a part of the word string. However, in this case, a user of the translation apparatus 1 orderly combines a preceding translated word string with a word string that can be acquired next by translating a word string of the source language and understands the combined word string, whereby lack of clarity of the preceding word string is resolved. Therefore, when a tag is located at the end of a translated word string, translation result data may be generated only by removing the aforementioned tag.

In this way, only when a tag is located at a location of a translated word string (non-end of the word string) where tag removal is difficult, by executing standby for translation, the standby time can be reduced as much as possible, and translation can be quickly performed (simultaneousness can be enhanced).

As long as a tag is located at a non-end location of a translated word string, a plurality of word strings indicated by second fragment data may be linked in order. However, to quickly output the translation result, when the number of words of the source language exceeds a predetermined number during standby, the translation unit 14 may terminate standby, start translation, and output the translation result as translation result data. In this case, the translation unit 14 may remove a tag from the word string of the target language that can be obtained by translation.

Also, to link word strings of the source language, syntax trees indicated by syntax data may be linked. In addition, the syntax analysis part 133 or the like may again perform syntax analysis for the entire word string of the source language that has been linked. Moreover, based on the acquired syntax tree, the translation unit 14 may translate the linked word string of the source language.

In addition, the translation unit 14 may stand by for translation as illustrated in FIG. 8 as long as a tag exists in a translated word string, including the situation where the tag is located at the end of the translated word string. In this case, the quickness (simultaneousness) of translation is decreased. However, as the entire word string is always translated without a tag, highly accurate translation is possible.

Second fragment data can be generated by the syntax evaluation unit 13 when a tag complements the forefront, the end, or the forefront and end of the word string of the source language indicated by first fragment data. Therefore, the translation unit 14 eventually translates a word string of the source language with a tag at its forefront.

However, a tag located at the forefront of the word string of the source language cannot be removed (substituted) by linking, behind the aforementioned word string, the word string indicated by the second fragment data. Accordingly, when there is a tag only at the forefront of the word string of the source language, significance of linking with the word string indicated by the second fragment data is small. When the translation unit 14 translates a word string of the source language with a tag only at its forefront, it is preferable to determine the necessity to link with the word string indicated by the second fragment data without considering the tag.

For instance, when the translation unit 14 translates a word string of the source language with a tag at its forefront, the tag may be removed, in advance, from the word string of the target language that can be obtained by translation. In this case, the tag located at the forefront of the word string of the source language is not included in the translated word string of the target language. Therefore, the translation unit 14 determines the necessity to link with the word string indicated by the second fragment data without considering the tag located at the forefront of the word string of the source language.

Also, for instance, when the translation unit 14 translates a word string of the source language with a tag at its forefront, the translation unit 14 translates the word string into a word string of the target language containing the tag, but may determine the necessity to link with the word string indicated by the second fragment data without considering the tag. In this case, the translation unit 14 needs to acknowledge whether the tag contained in the translated word string of the target language is located at the forefront or end of the word string of the source language. For instance, the grammatical element complementing part 132 may differentiate a tag that complements the portion in front of the word string indicated by the first fragment data from a tag that complements the portion after the aforementioned word string so that the translation unit 14 can recognize the difference. Specifically, for instance, different bracket symbols indicating the tags may be used, e.g., "[NP]" and "{NP}", or a symbol may be used to distinguish the tags, e.g., "[NP*]" and "[NP]."

In the foregoing manner, the translation unit 14 ignores a tag that cannot be translated by linking word strings of the source language (tag located at the forefront of the word string of the source language) and determines the necessity of standby for translation based only on a tag that can be translated by linking word strings of the source language (tag located at the end of the word string of the source language). Thereby, unnecessary standby can be prevented from occurring. Accordingly, the standby time can be reduced as much as possible, and quick translation (simultaneousness can be enhanced) is possible.

<Translation Performance>

Figure 9:
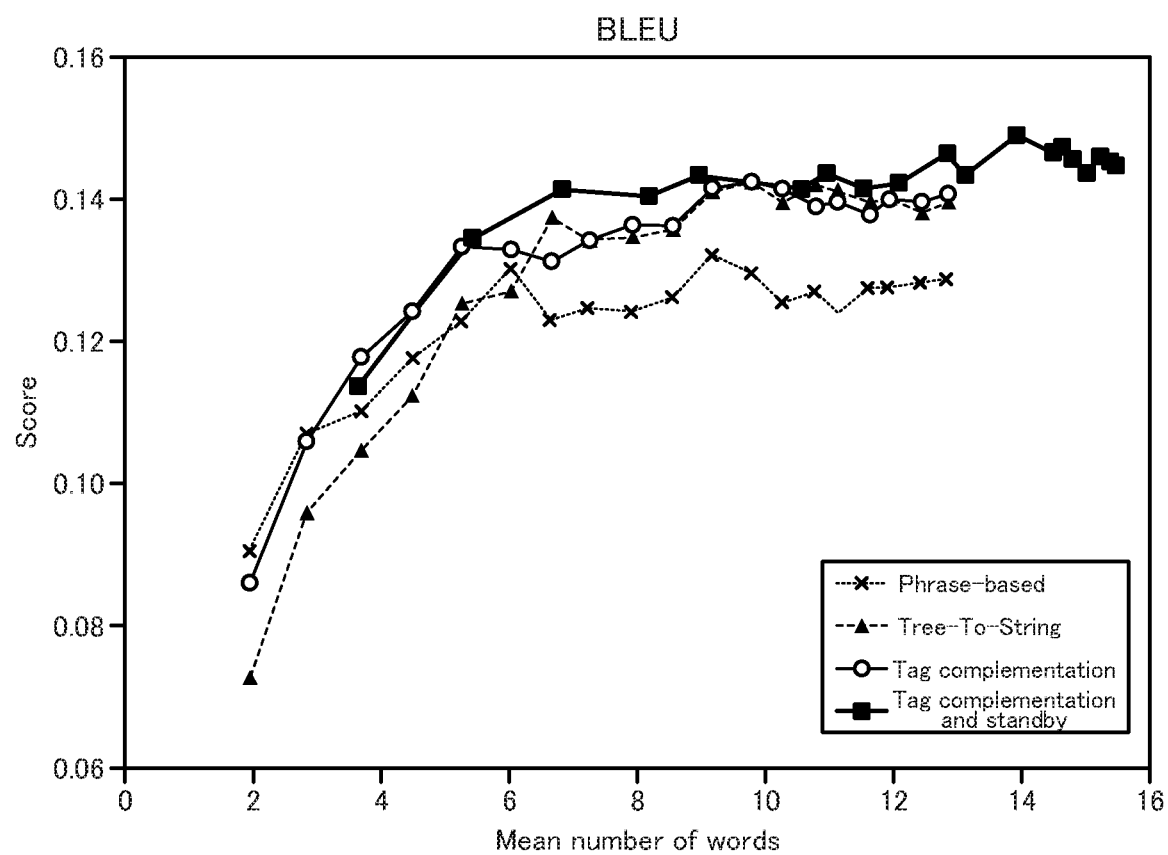
FIG. 9 is a graph illustrating the results of comparison, in terms of translation accuracy, between the translation apparatus in accordance with the embodiment of the present invention and another translation apparatus.
Figure 10:
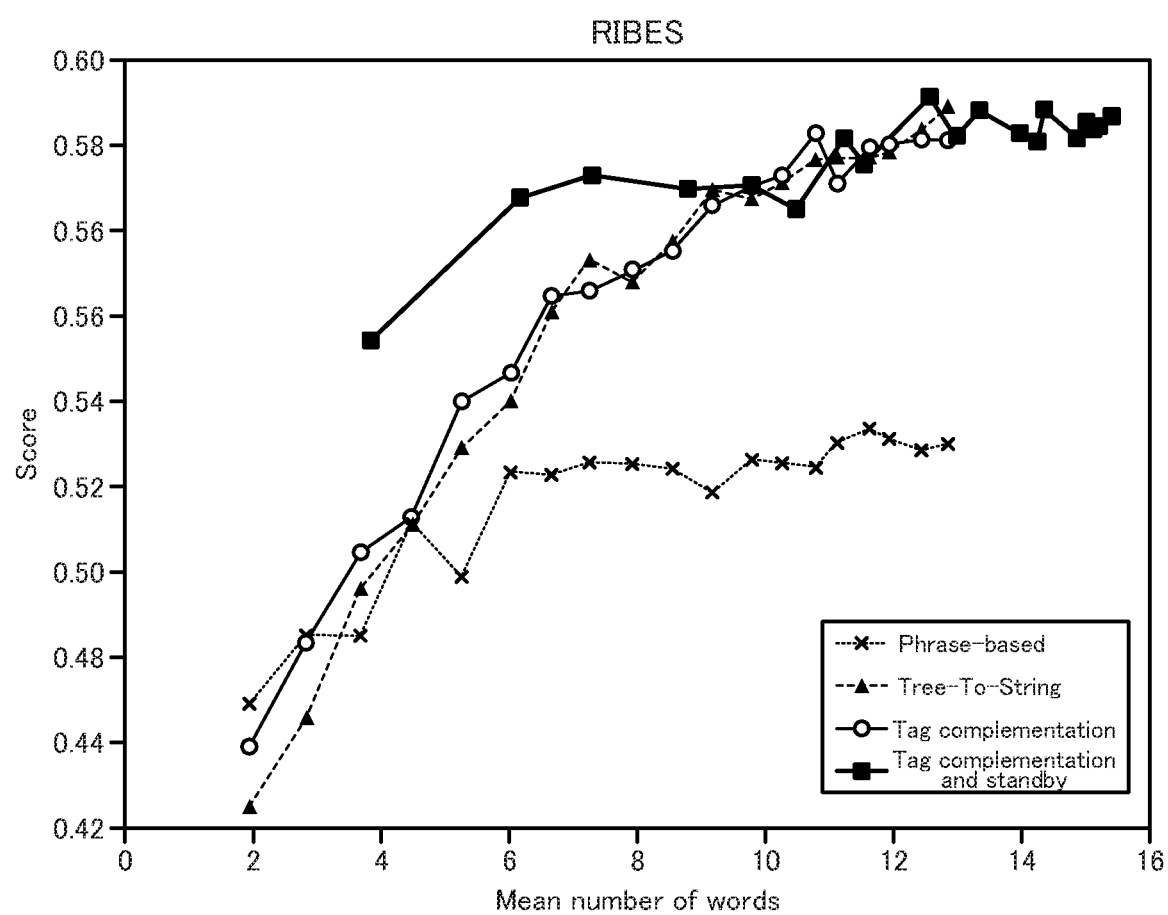
FIG. 10 is a graph illustrating the results of comparison, in terms of translation accuracy, between the translation apparatus in accordance with the embodiment of the present invention and another translation apparatus.

One example illustrating the translation performance of the aforementioned translation apparatus 1 will be explained in reference to the drawings. FIGS. 9 and 10 are graphs illustrating the results of comparison between the translation apparatus in accordance with the embodiment of the present invention and another translation apparatus in terms of translation accuracy. FIG. 9 is a graph illustrating the situation of employing BLEU as a translation accuracy evaluation method. FIG. 10 is a graph illustrating the situation of employing RIBES as a translation accuracy evaluation method.

BLEU and RIBES are publicly known evaluation methods in which the score of the translation increases as the translation result becomes closer to the reference translation. However, BLEU is a method of locally evaluating a short word string (specifically, an evaluation method of giving a higher score for correct translation of a phrase). RIBES is different from BLEU is that the former is a broad evaluation method focusing on the word order (specifically, an evaluation method of giving a higher score not only for correct translation of a phrase, but also for a correct word order).

FIGS. 9 and 10 are graphs illustrating the BLEU and RIBES scores of the respective translation methods when a predetermined word string is segmented into a various number of words and translated in sequence. In each graph, the horizontal axis represents the mean number of words to be translated, and the vertical axis represents the BLEU and RIBES scores. Also, in each graph, the evaluation results of phrase-based translation are depicted by the fine dashed line and the crossed-out (x) symbol. As well, the evaluation results of Tree-To-String translation are depicted by the coarse dashed line and the black triangle (▲) symbol. In addition, the evaluation results of the translation method of performing only tag complementation are depicted by the thin solid line and the white circle (○) symbol. Moreover, the evaluation results of the translation method of only performing tag complementation and standby are depicted by the thick solid line and the black square (■) symbol.

In the translation method of performing only tag complementation, in the aforementioned translation apparatus 1 in accordance with the embodiment of the present invention, the syntax evaluation unit 13 performs tag complementation illustrated in FIGS. 5A to 5D. However, the translation unit 14 does not perform the standby illustrated in FIG. 8. In this case, when a tag is contained in a word string indicated by second fragment data, the translation unit 14 removes a tag from the word string of the target language, which is the translation result. In the translation method of performing tag complementation and standby, in the aforementioned translation apparatus 1 in accordance with the embodiment of the present invention, the syntax evaluation unit 13 performs tag complementation illustrated in FIGS. 5A to 5D. In addition, the translation unit 14 performs the standby illustrated in FIG. 8.

The graphs of FIGS. 9 and 10 do not illustrate any evaluation result that the mean number of words is approximately 4 or below in the translation method of performing tag complementation and standby. When the number of words of a word string to be segmented (specifically, the number of words contained in a word string indicated by first fragment data) decreases, the translation unit 14 frequently performs the standby illustrated in FIG. 8, links word strings of the source language, and then performs translation.

As illustrated in FIGS. 9 and 10, since phrase-based translation is focused only on a phrase, when the simultaneousness of translation is compromised to increase the number of words to be translated (increase the number of words of a segmented word string), the translation accuracy is not high (relatively low) compared with the other three translation methods.

In Tree-To-String translation, when the simultaneousness of translation is enhanced to decrease the number of words to be translated (decrease the number of words of a segmented word string), the translation accuracy is low as translation is performed based on an incorrect syntax analysis result.

In contrast, the translation apparatus 1 according to the embodiment of the present invention performs only tag complementation in one translation method and performs and tag complementation and standby in another translation method. In these translation methods, when the number of words to be translated is decreased (the number of words of a segmented word string is decreased) to enhance the simultaneousness of translation, the translation accuracy can be enhanced as translation can be performed based on a correct syntax analysis result acquired from complementation of a grammatical element. In particular, as clearly demonstrated in the evaluation result of the translation method of performing tag complementation and standby in FIG. 10, when the number of words to be translated is decreased (the number of words of a segmented word string is decreased) to enhance the simultaneousness of translation, the translation apparatus 1 in accordance with the embodiment of the present invention can maintain a relatively high level of translation accuracy.

<Modification, etc.>

(1) In the aforementioned translation apparatus 1 in accordance with the embodiment of the present invention, the grammatical element guessing part 131 may guess a tag used for complementation pursuant to a pre-constructed method of guessing a tag (predefined rule) without conducting the example machine learning of training data illustrated in FIGS. 3A to 3C.

Also, in the aforementioned translation apparatus 1 in accordance with the embodiment of the present invention, the translation unit 14 determines the necessity of standby for translation (linkage of the source language) pursuant to the predefined rule (specifically, determines the necessity of standby for translation according to whether a tag exists in the translated word string of the target language and the tag location). However, a grouping unit constructed through machine learning may be used to determine the necessity of standby for translation. For instance, in this case, the translation unit 14 may construct the aforementioned grouping unit through study of many combinations between a tag-containing word string of the source language and the necessity of standby for translation when translating the aforementioned word string.

(2) As well, in the aforementioned translation apparatus 1 in accordance with the embodiment of the present invention, the grammatical element guessing part 131 may guess, as a grammatical element at the lower level or a part of the upper level of the syntax tree, a grammatical element that should be connected before and after the word string indicated by first fragment data.

Specifically, for instance, in the middle of the example sentence of FIGS. 7 and 8, as grammatical elements that should be connected before and after the word string indicated by the first fragment data, the grammatical element guessing part 131 guesses "NP", which is the lower-level grammatical element that can be connected directly after "take." However, the grammatical element guessing part 131 may guess that a part of "VP", which is the upper-level grammatical element containing "take" (remainder of "VP" not containing "take"), can be connected directly after "take." In the present invention, as in the case of the lower-level grammatical element ("VP"), this kind of part of the upper-level grammatical element (part of "VP") is handled as a grammatical element.

In the aforementioned specific example, a grammatical element that should be connected after the word string indicated by the first fragment data is guessed. However, likewise, a grammatical element that should be connected before the word string indicated by the first fragment data may be guessed as well.

Also, it is preferable that the grammatical element guessing part 131 differentiates kinds of tags complemented by the grammatical element complementing part 132, based on whether the grammatical element that should be connected before and after the word string indicated by the first fragment data is guessed as a grammatical element at the lower hierarchy or a part of the upper hierarchy of the syntax tree. There is an example situation where the grammatical element guessing part 131 determines, as a part of the upper-level grammatical element, a grammatical element that should be connected before and after the word string indicated by the first fragment data. In this situation, the grammatical element complementing part 132 may complement a tag, such as "@VP", to which a certain type of symbol is added (in this case, "@"). On the other hand, when the grammatical element guessing part 131 guesses, as a grammatical element at the lower hierarchy, a grammatical element that should be connected before and after the word string indicated by the first fragment data, the grammatical element complementing part 132 may complement a tag to which a symbol is not added, e.g., "[NP]."

When the grammatical element guessing part 131 guesses a grammatical element that should be connected before and after the word string indicated by the first fragment data, a method of guessing the aforementioned grammatical element as a grammatical element at the lower hierarchy of the syntax tree or a method of guessing the aforementioned grammatical element as a part of the grammatical element at the upper hierarchy of the syntax tree may be adopted (alternatively, one of the aforementioned guessing methods is prioritized over the other). Which method is to be selected should be appropriately determined depending on the design of the syntax evaluation unit 13, the translation unit 14, and the translation apparatus 1 (in particular, the translation method adopted in the translation unit 14).

(3) Moreover, in the aforementioned translation apparatus 1 in accordance with the embodiment of the present invention, the grammatical element guessing part 131 and the grammatical element complementing part 132 may be configured not to guess or complement a grammatical element that should be connected before and after the word string indicated by the first fragment data. The grammatical element guessing part 131 and the grammatical element complementing part 132 may be configured to guess and complement only a grammatical element that should be connected after the word string indicated by the first fragment data. To generate second fragment data by which a correct syntax analysis result can be obtained, it is preferable to guess a grammatical element that should be connected before and after the word string indicated by the first fragment data. However, only by guessing a grammatical element that should be connected after the word string indicated by the first fragment data, it is possible to generate second fragment data from which a somewhat correct syntax analysis result can be obtained and to perform the translation of FIG. 8 in which word strings of the source language are linked.

(4) Text data generated by the text data generation unit 11 does not necessarily has to be composed of data that expresses a character (character data) of the source language as-is. The aforementioned text data may be composed of data that expresses a word or morpheme of the source language by a predetermined code (code data). For instance, when a string of the source language indicated by text data (morpheme string) is "kore ha pen de su", this string (morpheme string) may be composed of code data, such as "3 5 20 7 0."

In this manner, by allowing code data to constitute text data indicating a string of the source language, the operation performed by the text data segmentation unit 12, the syntax evaluation unit 13, and the translation unit 14 is simplified, whereby the processing speed (simultaneousness) can be increased.

The aforementioned generation of code data or conversion into code data may be performed at any stage between the stage of generating text data by the text data generation unit 11 and the stage prior to translation of the second fragment data by the translation unit 14. Specifically, it is possible to perform processing for generating text data composed of code data, processing for converting character data constituting the text data into code data, processing for converting character data constituting the first fragment data into code data, and processing for converting character data constituting the second fragment data into code data. However, it is preferable to perform generation of code data or conversion into code data as early a stage as possible in the processing by the translation apparatus 1 as the ease of the subsequent processing and the processing speed (simultaneousness) are increased.

INDUSTRIAL APPLICABILITY

The present invention may be used in a translation apparatus that translates the source language into the target language, a syntax evaluation apparatus employed in the translation apparatus, a syntax evaluation method, and a syntax evaluation program.

DESCRIPTION OF SYMBOLS

1 translation apparatus
10 speech data generation unit
11 text data generation unit
12 text data segmentation unit
13 syntax evaluation unit (syntax evaluation apparatus)
131 grammatical element guessing part
132 grammatical element complementing part
133 syntax analysis part
14 translation unit
15 translation result output unit

The invention claimed is:

1. A translation apparatus comprising a syntax evaluation apparatus and a translation unit, wherein the syntax evaluation apparatus comprises:

a grammatical element guessing part that guesses, based on first fragment data that is acquired by segmenting text data indicating a string of a source language and that indicates at least one word, a grammatical element that should be connected before and after or after a word string indicated by the first fragment data;

a grammatical element complementing part that generates, based on a guessing result of the grammatical element guessing part, second fragment data by complementing the first fragment data as necessary; and a syntax analysis part that performs syntax analysis of a word string indicated by the second fragment data, identifies a grammatical element of the word string indicated by the second fragment data, and generates syntax data that express a structure of the word string by the grammatical element, wherein when the grammatical element guessing part guesses a grammatical element, the grammatical element complementing part generates the second fragment data by complementing a tag at a location to which the grammatical element of the word string indicated by the first fragment data should be connected, the tag indicating the grammatical element and when the grammatical element guessing part does not guess a grammatical element, the grammatical element complementing part handles the first fragment data as the second fragment data, wherein the translation unit translates a word string of the source language that is obtained by acquiring the second fragment data into a word string of a target language so that a word order is based on the syntax data, and wherein the syntax evaluation apparatus that sequentially acquires the first fragment data that is obtained by segmenting the text data in order from beginning to end, and sequentially generates the second fragment data;

the translation unit translates, into a word string of the target language containing the tag, a word string of the source language containing the tag, the word string of the source language being obtained by acquiring the second fragment data; and when the tag is contained in the word string of the target language that is acquired by translation, the translation unit again performs translation for a word string of the source language formed by linking, behind the pre-translated word string of the source language, a word string of the source language indicated by the second fragment data that is generated next by the syntax evaluation apparatus.

2. The translation apparatus according to claim 1, wherein when the tag is located at a location other than an end of the word string of the target language that is obtained by translation, the translation unit again performs translation for a word string of the source language formed by linking, behind the pre-translated word string of the source language, a word string of the source language indicated by the second fragment data that is generated next by the syntax evaluation apparatus; and when the tag is located at the end of the word string of the target language that is obtained by translation, the translation unit removes, from the word string of the target language, the tag located at the end of the word string.

3. The translation apparatus according to claim 1, wherein when the translation unit translates a word string of the source language in which the tag is located at its beginning and which is obtained by acquiring the second fragment data, the translation unit determines whether to remove in advance the tag located at the beginning of the pre-translated word string of the source language from the word string of the target language that is obtained by translation; or whether to link, behind the pre-translated word string of the source language, a word string of the source language indicated by the second fragment data that the syntax evaluation apparatus generates next without considering the tag that is located at the beginning of the pre-translated word string of the target language and is contained in the word string of the target language that is obtained by translation.

4. The translation apparatus according to claim 1, wherein:

based on a predetermined number of consecutive words following a first word of the word string indicated by the first fragment data, the grammatical element guessing part guesses a grammatical element that should be connected before the word string indicated by the first fragment data; and based on a predetermined number of consecutive words preceding a last word of the word string indicated by the first fragment data, the grammatical element guessing part guesses a grammatical element that should be connected after the word string indicated by the first fragment data.

5. The translation apparatus according to claim 1, wherein:

the syntax analysis part further performs syntax analysis of the word string indicated by the first fragment data and that identifies a grammatical element of the word string indicated by the first fragment data; and based on the grammatical element of the word string indicated by the first fragment data identified by the syntax analysis part, the grammatical element guessing part guesses the grammatical element that should be connected before and after or after the word string indicated by the first fragment data.

6. A translation method comprising a syntax evaluation step and a translation step, wherein the syntax evaluation step comprises:

a grammatical element guessing step of guessing, based on first fragment data that is obtained by segmenting text data indicating a string of a source language and that indicates at least one word, a grammatical element that should be connected before and after or after a word string indicated by the first fragment data;

a syntax analysis step of performing syntax analysis of a word string indicated by a second fragment data, identifies a grammatical element of the word string indicated by the second fragment data, and generating syntax data that express a structure of the word string by the grammatical element;

a grammatical element complementing step of generating, based on a guessing result of the grammatical element guessing step, second fragment data by complementing the first fragment data as necessary, wherein, in the grammatical element complementing step, when a grammatical element is guessed in the grammatical element guessing step, the second fragment data is generated by complementing a tag at a location to which the grammatical element of the word string indicated by the first fragment data should be connected, the tag indicating the grammatical element; and when a grammatical element is not guessed in the grammatical element guessing step, the first fragment data is handled as the second fragment data;

wherein, in the translation step, a word string of the source language that is obtained by acquiring the second fragment data is translated into a word string of a target language so that a word order is based on the syntax data wherein the syntax evaluation step further comprises sequentially acquiring the first fragment data that is obtained by segmenting the text data in order from beginning to end, and sequentially generating the second fragment data;

wherein, in the translation step:

a word string of the source language containing the tag is translated into a word string of the target language containing the tag, the word string of the source language being obtained by acquiring the second fragment data; and when the tag is contained in the word string of the target language that is acquired by translation, translation is again performed for a word string of the source language formed by linking, behind the pre-translated word string of the source language, a word string of the source language indicated by the second fragment data that is generated next in the syntax evaluation step.

7. A non-transitory computer readable storage medium having instructions that, when executed by a computer, cause the computer to perform the translation method according to claim 6.

8. A method for translating source language text into target language text, including:

training a grammatical element guessing part using teaching data;

using the grammatical element guessing part as trained, guessing a grammatical element that should be connected before and after or after a word string indicated by a first fragment data that is obtained by segmenting text data indicating a string in the source language and having a length of at least one word;

whenever a grammatical element is guessed, generating from the first fragment data, a second fragment data by complementing a tag at a location to which the grammatical element of the word string indicated by the first fragment data should be connected, the tag indicating the grammatical element guessed, otherwise using the first fragment data as the second fragment data whenever a grammatical element could not be guessed;

using the second fragment data, generating syntax data that express a structure of the word string including the grammatical element guessed;

using the syntax data, translating a string in the source language obtained from the second fragment data and containing the tag into a word string of a target language containing the tag; and whenever the tag is located at a location other than an end of the word string of the target language as translated, performing a second translation of a word string of the source language formed by linking, behind a previously translated word string of the source language, a word string of the source language indicated by second fragment data that is generated next.

9. The method of claim 8, further including the teaching data indicating:

(i) correspondence between a word string of an example sentence and a syntax tree that correctly illustrates the grammatical element of the word string;

(ii) a notation indicating beginning of the word string; and (iii) a tag indicating a grammatical element of an absent phrase or word complements the phrase or word when extraction of a word causes a phrase or word corresponding to a node of the syntax tree to be absent in each training data.

\* \* \* \* \*